(12) United States Patent
Chew

(10) Patent No.: US 7,437,505 B2
(45) Date of Patent: Oct. 14, 2008

(54) LOGICAL TO PHYSICAL DEVICE TOPOLOGICAL LOCATION MAPPINGS

(75) Inventor: Michael N. Chew, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 239 days.

(21) Appl. No.: 11/441,297

(22) Filed: May 24, 2006

(65) Prior Publication Data

US 2007/0276992 A1    Nov. 29, 2007

(51) Int. Cl.
*G06F 12/00* (2006.01)
(52) U.S. Cl. .................. 711/112; 711/115; 711/154; 711/202
(58) Field of Classification Search .................. None
See application file for complete search history.

(56) References Cited

U.S. PATENT DOCUMENTS

| | | | | |
|---|---|---|---|---|
| 5,305,013 | A  * | 4/1994 | Daniels .................. | 345/82 |
| 5,559,958 | A  * | 9/1996 | Farrand et al. .................. | 714/27 |
| 6,128,016 | A  * | 10/2000 | Coelho et al. .................. | 715/808 |
| 6,188,973 | B1 * | 2/2001 | Martinez et al. .................. | 702/188 |
| 6,384,842 | B1 * | 5/2002 | DeKoning et al. .................. | 715/734 |
| 6,865,717 | B2 * | 3/2005 | Wright .................. | 715/772 |
| 2002/0180795 | A1* | 12/2002 | Wright .................. | 345/772 |

* cited by examiner

*Primary Examiner*—Kevin Verbrugge
(74) *Attorney, Agent, or Firm*—Osha Liang LLP

(57) ABSTRACT

A computer readable medium includes executable instructions for visually representing a status of a plurality of storage device slots and a plurality of attached storage devices by, and a method for visually representing a status of a plurality of storage device slots and a plurality of attached storage devices includes, assigning a logical name to a storage device slot based on an enumeration rule; detecting a storage device attached to a computer system; storing a correlation between a physical location of the storage device slot and the assigned logical name; monitoring an availability and an operating status of the plurality of storage device slots and the plurality of attached storage devices; and generating a what-you-see-is-what-you-get (WYSIWYG) representation of the plurality of storage device slots and the plurality of attached storage devices, wherein the WYSIWYG representation includes physical location information, operating status information, and logical names for the plurality of storage device slots and the plurality of attached storage devices. A storage device location program includes an operating system configured to assign a logical name to a storage device attached to a computer system; a mapping software configured to correlate the logical name to a physical device name of the storage device attached to the computer system; a status detecting program configured to update an operating status of the storage device; and a display program configured to generate a what-you-see-is-what-you-get (WYSIWYG) representation of a physical location of the storage device attached to the computer system.

19 Claims, 8 Drawing Sheets

| Controller 1 | | Controller 2 | | Controller 3 | | Controller 4 | | Controller 5 | | Controller 6 | |
|---|---|---|---|---|---|---|---|---|---|---|---|
| Controller Logical 304 Name A | | Controller Logical 306 Name B | | Controller Logical 308 Name C | | Controller Logical 310 Name D | | Controller Logical 312 Name C | | Controller Logical 314 Name D | |
| P36 | P37 | P38 | P39 | P40 | P41 | P42 | P43 | P44 | P45 | P46 | P47 |
| D14 | D18 | D24 | D28 | D34 | D38 | D44 | D48 | D54 | D58 | D64 | D68 |
| P24 | P25 | P26 | P27 | P28 | P29 | P30 | P31 | P32 | P33 | P34 | P35 |
| D13 | D17 | D23 | D27 | D33 | D37 | D43 | D47 | D53 | D57 | D63 | D67 |
| P12 | P13 | P14 | P15 | P16 | P17 | P18 | P19 | P20 | P21 | P22 | P23 |
| D12 | D16 | D22 | D26 | D32 | D36 | D42 | D46 | D52 | D56 | D62 | D66 |
| P0 | P1 | P2 | P3 | P4 | P5 | P6 | P7 | P8 | P9 | P10 | P11 |
| D11 | D15 | D21 | D25 | D31 | D35 | D41 | D45 | D51 | D55 | D61 | D65 |

302

P__:Physical Storage Device Name
D__: Logical Storage Device Name

| Controller 1 | | Controller 2 | | Controller 3 | | Controller 4 | | Controller 5 | | Controller 6 | |
|---|---|---|---|---|---|---|---|---|---|---|---|
| Controller Logical 304 Name A | | Controller Logical 306 Name B | | Controller Logical 308 Name C | | Controller Logical 310 Name D | | Controller Logical 312 Name C | | Controller Logical 314 Name D | |
| P36 | P37 | P38 | P39 | P40 | P41 | P42 | P43 | P44 | P45 | P46 | P47 |
| D14 | D18 | D24 | D28 | D34 | D38 | D44 | D48 | D54 | D58 | D64 | D68 |
| P24 | P25 | P26 | P27 | P28 | P29 | P30 | P31 | P32 | P33 | P34 | P35 |
| D13 | D17 | D23 | D27 | D33 | D37 | D43 | D47 | D53 | D57 | D63 | D67 |
| P12 | P13 | P14 | P15 | P16 | P17 | P18 | P19 | P20 | P21 | P22 | P23 |
| D12 | D16 | D22 | D26 | D32 | D36 | D42 | D46 | D52 | D56 | D62 | D66 |
| P0 | P1 | P2 | P3 | P4 | P5 | P6 | P7 | P8 | P9 | P10 | P11 |
| D11 | D15 | D21 | D25 | D31 | D35 | D41 | D45 | D51 | D55 | D61 | D65 |

302

P__:Physical Storage Device Name

D__: Logical Storage Device Name

*FIG. 3*

```
platform = Thumper

Device      Serial         Vendor    Model               Revision  Temperature
------      ------         ------    -----               --------  -----------
c0t0d0s2    K41BT4C7M6PS   HITACHI   HDS7225SBSUN250G    V440      None
c0t4d0s2    K41BT4C7N4HS   HITACHI   HDS7225SBSUN250G    V440      None
c1t0d0s2    K41BT4C7NTSS   HITACHI   HDS7225SBSUN250G    V440      None
c1t4d0s2    K41BT4C7NXHS   HITACHI   HDS7225SBSUN250G    V440      None
c2t0d0s2                   AMI       Virtual CDROM       1.00      None
c3t0d0s2                   AMI       Virtual Floppy      1.00      None
c4t0d0s2                   TEAC      DV-W516GA           C452      None
c5t0d0s2    K41BT4C7NVYS   HITACHI   HDS7225SBSUN250G    V440      None
c5t4d0s2    K41BT4C7HP2S   HITACHI   HDS7225SBSUN250G    V440      None
c6t0d0s2    K41BT4C7P2BS   HITACHI   HDS7225SBSUN250G    V440      None
c6t4d0s2    K41BT4C7NG1S   HITACHI   HDS7225SBSUN250G    V440      None
c7t0d0s2    K41BT4C7N54S   HITACHI   HDS7225SBSUN250G    V440      None
c7t4d0s2    K41BT4C7NVES   HITACHI   HDS7225SBSUN250G    V440      None
c8t0d0s2    K41BT4C7HKRS   HITACHI   HDS7225SBSUN250G    V440      None
c8t4d0s2    K41BT4C7N49S   HITACHI   HDS7225SBSUN250G    V440      None ----------------------Thumper-------------Rear-----------------------------
36:  37:  38:  39:  40:  41:  42:  43:  44:  45:  46:  47:
c6c3 c6c7 c5c3 c5c7 c8c3 c8c7 c7c3 c7c7 c1t3 c1t7 c0t3 c0t7
 ^-   ^-   ^-   ^-   ^-   ^-   ^-   ^-   ^-   ^-   ^-   ^-
24:  25:  26:  27:  28:  29:  30:  31:  32:  33:  34:  35:
c6c2 c6c6 c5c2 c5c6 c8c2 c8c6 c7c2 c7c6 c1t2 c1t6 c0t2 c0t6
 ^-   ^-   ^-   ^-   ^-   ^-   ^-   ^-   ^-   ^-   ^-   ^-
12:  13:  14:  15:  16:  17:  18:  19:  20:  21:  22:  23:
c6c1 c6c5 c5c1 c5c5 c8c1 c8c5 c7c1 c7c5 c1t1 c1t5 c0t1 c0t5
 ^-   ^-   ^-   ^-   ^-   ^-   ^-   ^-   ^-   ^-   ^-   ^-
0:   1:   2:   3:   4:   5:   6:   7:   8:   9:   10:  11:
c6c0 c6c4 c5c0 c5c4 c8c0 c8c4 c7c0 c7c4 c1t0 c1t4 c0t0 c0t4
 ^b+  ^b+  ^++  ^++  ^++  ^++  ^++  ^++  ^++  ^++  ^++  ^++
----------------------Thumper-------------Front----------------------------

Summary:
Vendor    Model               Count
------    -----               -----
HITACHI   HDS7225SBSUN250G    12
AMI       Virtual CDROM       1
AMI       Virtual Floppy      1
TEAC      DV-W516GA           1

Total Storage Devices = 15
```

LOGICAL TO PHYSICAL DEVICE TOPOLOGICAL LOCATION MAPPINGS

BACKGROUND

Storage devices in a computer system are typically enumerated in certain logical orders based on device probing sequences for the computer system, BIOS, and operating systems. Logical device names are assigned to the storage devices to allow the system software and a variety of applications to access the storage devices.

A logical name for a storage device is assigned at the time of the addition of the storage device to the computer system based on enumeration by probing sequences for the computer system. In most cases, the assignment of logical names to storage devices is contingent upon the timing and the order of device additions. As the number of storage devices attached to the computer system grows, it becomes increasingly difficult to correlate physical locations of the storage devices with dynamically assigned logical names.

Traditionally, the correlation between the logical device names and the physical locations is determined by analyzing and parsing cryptic log files. In one example, an end-user who notices a storage device failure needs to parse error messages contained in the log files to determine the actual location of the failing storage device. With a large number of storage devices attached to the computer system, it is difficult and error-prone to track the status and location of all storage devices by parsing such log files.

End-users will appreciate features which enable them to physically locate the storage devices using a simple command. As the logical names assigned by the computer system do not give any clue to the actual location of the storage devices, a topological location view of the physically mapped storage devices will be highly useful if the end-users need to add, remove, or swap a particular storage device in the computer system.

SUMMARY

In accordance with one or more embodiments, a computer readable medium comprises executable instructions for visually representing a status of a plurality of storage device slots and a plurality of attached storage devices by assigning a logical name to a storage device slot based on an enumeration rule; detecting a storage device attached to a computer system; storing a correlation between a physical location of the storage device slot and the assigned logical name; monitoring an availability and an operating status of the plurality of storage device slots and the plurality of attached storage devices; and generating a what-you-see-is-what-you-get (WYSIWYG) representation of the plurality of storage device slots and the plurality of attached storage devices, wherein the WYSIWYG representation includes physical location information, operating status information, and logical names for the plurality of storage device slots and the plurality of attached storage devices.

In accordance with one or more embodiments, a storage device location program comprises an operating system configured to assign a logical name to a storage device attached to a computer system; a mapping software configured to correlate the logical name to a physical device name of the storage device attached to the computer system; a status detecting program configured to update an operating status of the storage device; and a display program configured to generate a what-you-see-is-what-you-get (WYSIWYG) representation of a physical location of the storage device attached to the computer system.

In accordance with one or more embodiments, a method for visually representing a status of a plurality of storage device slots and a plurality of attached storage devices, comprises assigning a logical name to a storage device slot based on an enumeration rule; detecting a storage device attached to a computer system; storing a correlation between a physical location of the storage device and the assigned logical name; monitoring an availability and an operating status of the plurality of storage device slots and the plurality of attached storage devices; and generating a what-you-see-is-what-you-get (WYSIWYG) representation of the plurality of storage device slots and the plurality of attached storage devices, wherein the WYSIWYG representation includes physical location information, operating status information, and logical names for the plurality of storage device slots and the plurality of attached storage devices.

BRIEF DESCRIPTION OF DRAWINGS

FIG. 3 shows a visual representation of an arrangement of storage devices with dynamically assigned logical names for a plurality of storage device controllers and a plurality of storage devices using an enumeration rule in accordance with an embodiment of the invention.

FIG. 7 shows a screenshot of a visual representation of attached storage device on a computer using a mapping software in accordance with an embodiment of the invention.

DETAILED DESCRIPTION

Figure 1:
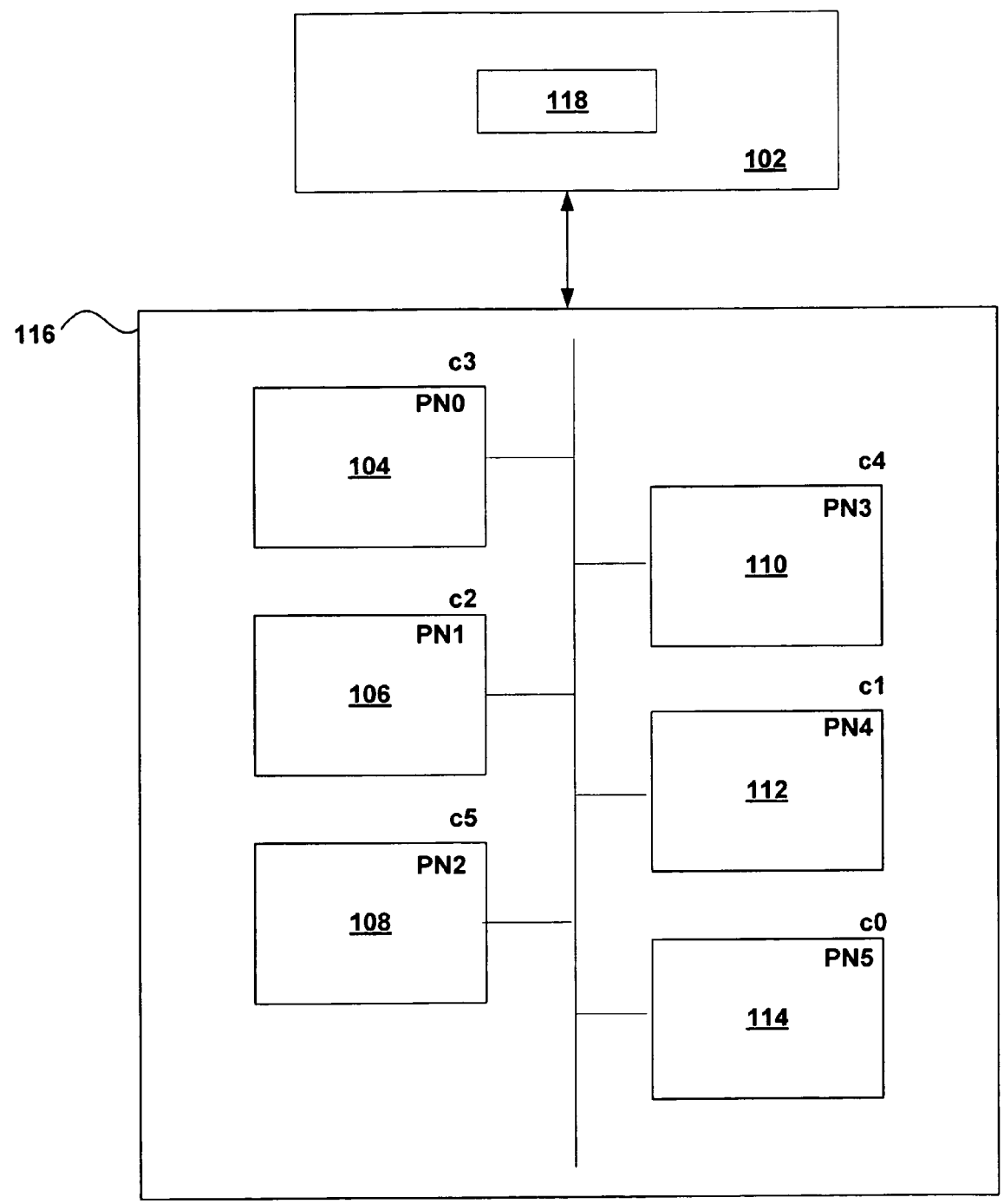
FIG. 1 shows a plurality of storage device controllers connected to a computer system in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and apparatus for creating a what-you-see-is-what-you-get (WYSIWYG) representation of a plurality of storage device slots attached to a plurality of storage device controllers.

In one or more embodiments of the invention, a WYSIWYG representation depicts a physical configuration of a plurality of storage devices attached to a plurality of storage device controllers. The WYSIWYG representation correlates physical names of a plurality of storage devices to its logical name counterparts assigned by an operating system.

In one or more embodiments of the invention, a WYSIWYG representation of a plurality of storage device slots attached to a plurality of storage device controllers include accessibility information for each storage device slot and functional status information for each attached storage device.

FIG. 1 shows a portion of a computer system 102 operatively connected to a multi-controller storage device system 116. In one or more embodiments of the invention, the multi-controller storage device system 116 include six individual storage device controllers 104, 106, 108, 110, 112, and 114. The individual storage device controllers are operatively connected to the multi-controller storage device system 116 via a hardware bus such as the PCI bus. In one or more embodiments of the invention, the portion of a computer system 102 includes a central processing unit 118. The central processing unit 118 requests and receives data from a plurality of storage devices connected to each individual storage device controller.

In one or more embodiments of the invention, an operating system of the computer system assigns logical controller names c3, c2, c5, c4, c1, and c0 to storage device controllers 104, 106, 108, 110, 112, and 114 based on a controller logical name enumeration rule related to a controller probing sequence. Each storage device controller also has its own physical names PN0, PN1, PN2, PN3, PN4, and PN5. A logical to physical topology mapping software correlates the assigned logical controller names to physical names for the storage device controllers and stores the correlation in a data structure.

Figure 2:
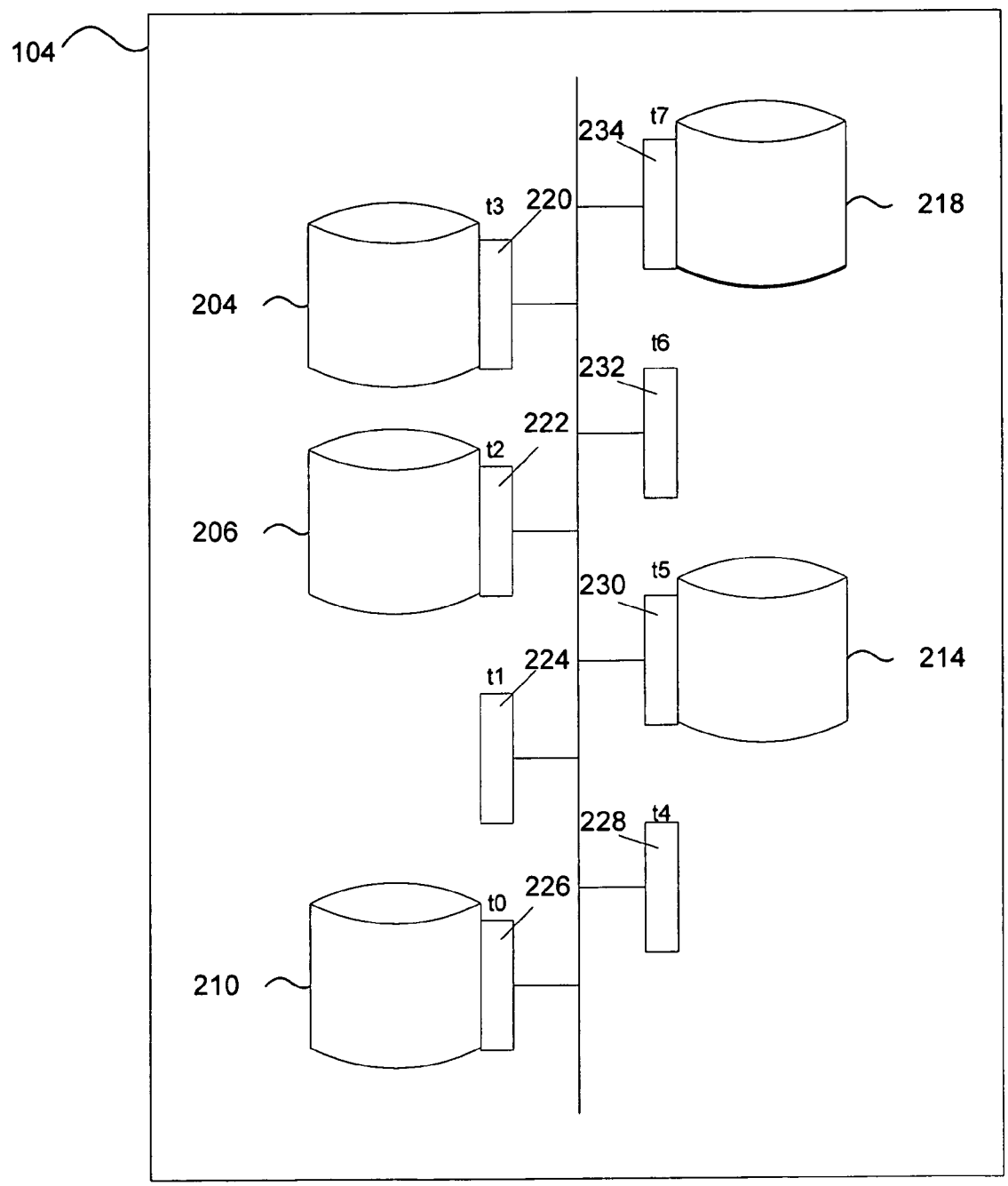
FIG. 2 shows a plurality of storage devices connected to a storage device controller in accordance with an embodiment of the invention.

FIG. 2 shows an individual storage device controller 104 comprising a plurality of storage device slots 220, 222, 224, 226, 228, 230, 232, and 234. In one or more embodiments of the invention, the individual storage device controller 104 contains eight storage device slots. Storage device slots 220, 222, 226, 230, and 234 are operatively connected to storage devices 204, 206, 210, 214, and 218. Some storage slots 224, 228, and 232 are not connected to any storage devices and remain empty. Each storage device slot has a designated physical name which is mapped to a logical name assigned by an operating system. The operating system assigns logical names to both connected and empty slots.

In one or more embodiments of the invention, the logical names for storage device slots are determined by a specific enumeration rule defined by the operating system based on a device probing sequence. For example, the operating system can assign logical names sequentially from a bottom-left storage device slot to a top-left storage device slot, and continue logical name assignment sequentially from a bottom-right storage device slot to a top-right storage device slot, as shown in FIG. 2 (t0-t7). On the other hand, physical names for the storage device slots are defined by a hardware configuration.

In one or more embodiments of the invention, a logical to physical topological location mapping software searches device path for each storage device slot from the operating system to the physical device level and stores correlations of the physical names for the storage device slots and the logical names assigned by the operating system in a data structure.

FIG. 3 shows a WYSIWYG representation of logical to physical name topology for a multi-controller storage device system. In one or more embodiments of the invention, the multi-controller storage device system includes six storage device controllers 304, 306, 308, 310, 312, and 314 and each storage device controller contains eight storage device slots. For example, a first storage device controller 304 has a physical name (i.e. Controller 1) and an assigned logical name (i.e. Logical Name A). Physical names for each storage device slot is defined by a hardware configuration.

In one or more embodiments of the invention, the physical names for the storage device slots are defined sequentially from a bottom-left storage device slot to a bottom-right storage device slot (i.e. P0-P11). The physical naming convention for storage device slots continue in upper sections from left to right (e.g. P12-P23, P24-P35, P36-P47). The physical names are defined sequentially, across different storage device controllers.

Continuing with the discussion of FIG. 3, logical names for storage device slots are assigned by an operating system which defines an enumeration rule based on a device probing sequence for a particular storage device controller. In one or more embodiments of the invention, the enumeration rule assigns logical names sequentially to storage device slots for a storage device controller, sweeping upwards from a bottom-left storage device slot to a top-left storage device slot (e.g. D11-D14) and then continuing from a bottom-right storage device slot to a top-right storage device slot (e.g. D15-D18). A first digit after letter "D" identifies a storage device controller and a second digit after "D" identifies a particular storage device slot. The operating system applies the same enumeration rule for storage device slots on other storage device controllers (e.g. D21-D28, D31-D38, D41-48, D51-58, D61-68). The correlation among logical and physical names for storage device slots and logical and physical names for storage device controllers is stored in a logical to physical topological location mapping software as one or more data structures.

Figure 4:
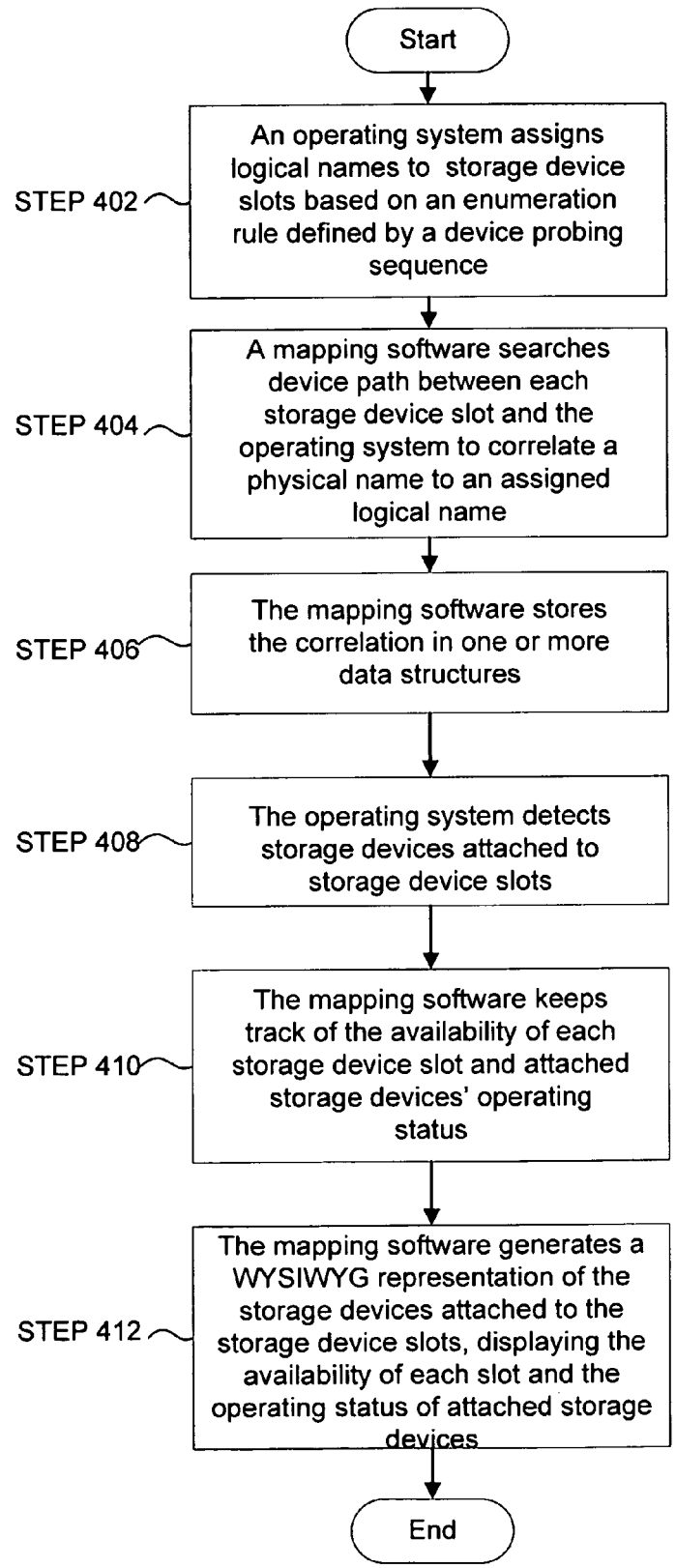
FIG. 4 shows a flowchart for producing a visual representation of attached storage devices to a computer system in accordance with an embodiment of the invention.

FIG. 4 shows a flowchart for logical to physical topological location mapping in accordance with one or more embodiments of the invention. In STEP 402, an operating system assigns logical names to storage device slots based on an enumeration rule defined by a device probing sequence. In one or more embodiments of the invention, the logical names use a numerical sequence per storage device controller. For example, the order of logical name assignment begins from a bottom storage device slot and ends at a top-left storage device slot. The order of logical names is different from the order of physical names, which can be sequentially defined by a hardware configuration across a plurality of storage device controllers.

In STEP 404, a mapping software searches device paths between storage device slots and the operating system to correlate physical names to assigned logical names. Device path information can be obtained based on information from a hardware bus, BIOS, and the operating system. In STEP 406, the mapping software stores the correlation between the physical names and the assigned logical names in one or more data structure. Because the physical names are defined by a hardware configuration, the mapping software can accurately represent physical locations of the storage device slots in a WYSIWYG display of the multi-controller storage device system.

Continuing with the discussion of FIG. 4, in STEP 408, the operating system detects storage devices attached to storage device slots. In one or more embodiments of the invention, a newly attached device sends a signal to a central processing unit, informing the operating system that the newly attached device is connected to a storage device slot. In STEP 410, the mapping software keeps track of an accessibility of each storage device slot and an operating status of attached storage devices. In one or more embodiments of the invention, the mapping software routinely checks accessibility of the storage device slots and updates operating information of attached storage devices in its data structures.

In STEP 412, the mapping software generates a WYSIWYG representation of the storage devices attached to the storage device slots and includes information regarding the accessibility of storage device slots and the operating status of the attached storage devices. In one or more embodiments of the invention, a user command triggers the mapping software to check storage device slots connected to a plurality of storage device controllers, gathers information on the operating status of the attached storage devices, stores the gathered information in one or more data structures in the mapping software, and generates the WYSIWYG representation of the multi-controller storage device system. In another embodiment of the invention, a routine check to the storage device slots and the attached storage devices gathers information on the operating status of the attached storage devices, stores the gathered information in one or more data structures of the mapping software, and generates the WYSIWYG representation of the multi-controller storage device system.

Figure 5:
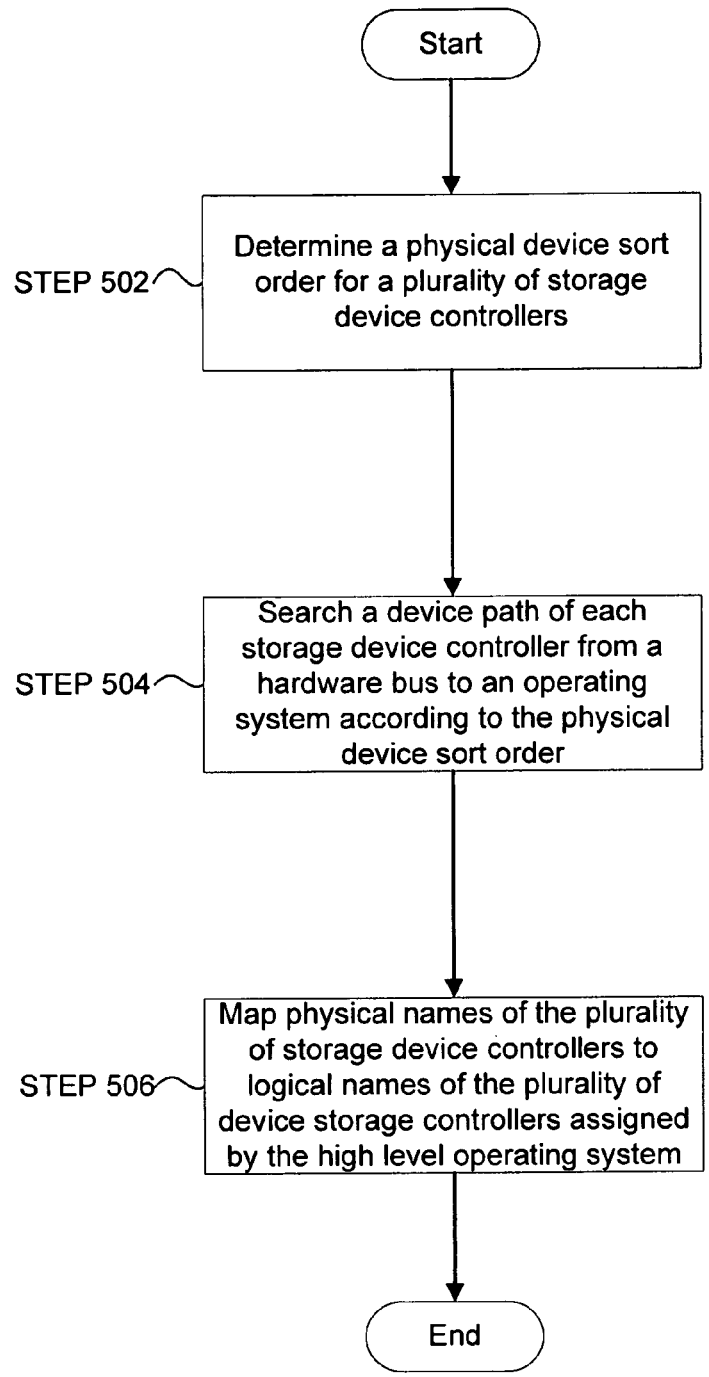
FIG. 5 shows a flowchart for correlating physical names of storage device controllers and logical names assigned by an operating system.

FIG. 5 shows a flowchart for correlating logical names to physical names for storage device controllers. In STEP 502, a physical sort order is determined for a plurality of storage device controllers. In STEP 504, a logical to physical topological location mapping software searches a device path of each storage device controller from a hardware bus (e.g. PCI bus) to an operating system according to the physical device sort order. In STEP 506, the logical to physical topological location mapping software correlates the physical names of all storage device controllers to logical names assigned by the operating system. In one or more embodiments of the invention, the operating system dynamically assigns a logical name to a storage device controller if at least one storage device is attached to the storage device controller.

Figure 6:
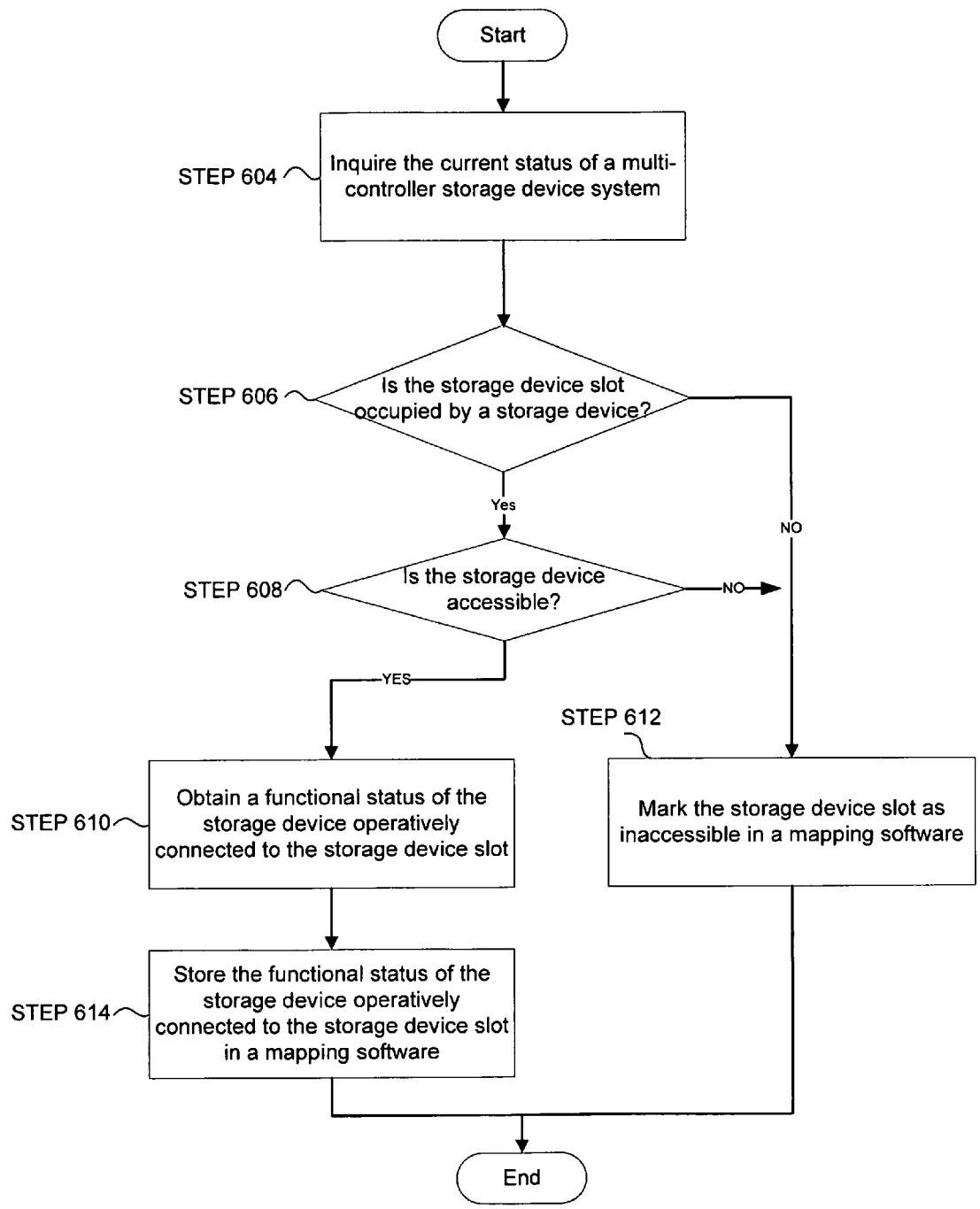
FIG. 6 shows a flowchart for correlating physical names of storage device slots to logical names assigned by an operating system and updating status of each attached storage device.

FIG. 6 shows a flowchart for gathering accessibility and operating information from a multi-controller storage device system for a WYSIWYG representation in accordance with the invention. In STEP 604, a logical to physical topological location mapping software inquires the current status of the multi-controller storage device system. In one or more embodiments of the invention, the inquiry to the multi-controller storage device system is a user command. In another embodiment of the invention, the inquiry is a routine polling. In STEP 606, the mapping software checks whether the storage device slot occupied by a storage device. If the storage device slot is occupied by a storage device, then the mapping software checks whether the storage device is accessible, as shown in STEP 608. Then, in STEP 610, the mapping software obtains a functional status of the storage device operatively connected to the storage device slot. In STEP 614, the obtained functional status of the storage device is stored in the mapping software. In one or more embodiments of the invention, the functional status of the storage device is stored in one or more data structures for the mapping software.

Continuing with the discussion of FIG. 6, if the storage device slot is not occupied by a storage device, as shown in STEP 606, or if the storage device is not accessible, as shown in STEP 608, then the mapping software marks the storage device slot as inaccessible.

FIG. 7 is a screenshot 702 of an embodiment of the invention, displaying a WYSIWYG configuration of a multi-controller storage device system. The front side 706 from the screenshot 702 reflects a physical front side of the multi-controller storage device system. Similarly, the rear side 704 from the screenshot 702 also reflects a physical rear side of the multi-controller storage device system. In this particular embodiment, each controller has eight slots and occupies two columns within the multi-controller storage device system (e.g. c6t0-c6t7, c5t0-c5t7, c8t0-c8t7, c7t0-c7t7, c1t0-c1t7, c0t0-c0t7). Several symbols indicate the status of storage device slots. For example, an up arrow "^" indicates that a status is for a device pointed by the arrow. A double-plus "++" indicates that a device pointed by the arrow is present and accessible. A double-minus "--" indicates that a device pointed by the arrow is not accessible, absent, empty, or down. A "b" character indicates that a storage device attached to a storage device slot is bootable if there is an operating system installed on the drive.

In one or more embodiments of the invention, the WYSIWYG configuration of a multi-controller storage device system is color-coded. The color codes can be used to distinguish which storage devices are enumerated, which storage device slots are empty (i.e. as opposed to containing inaccessible storage devices), and etc.

In addition, in one or more embodiments of the invention, the mapping software generates a list of attached storage devices. For each storage device, the list can contain a logical name for each device, a serial number, a vendor name, a model name, a revision code, and temperature information. Further, the mapping software can also generate a summary information displaying the number of storage devices by vendor and model.

Figure 8:
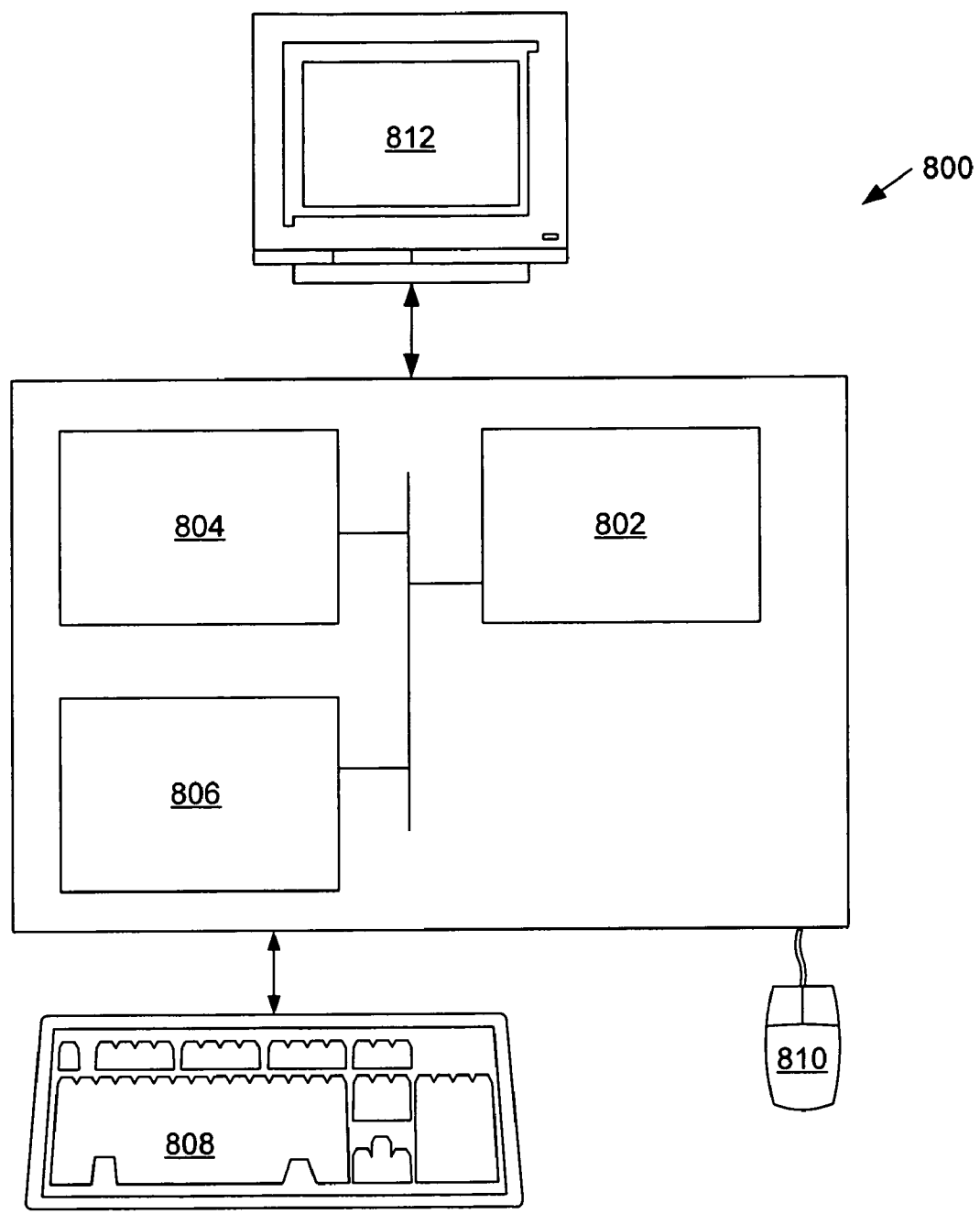
FIG. 8 shows a computer system in accordance with an embodiment of the invention.

The invention may be implemented on virtually any type of computer regardless of the platform being used. For example, as shown in FIG. 8, a computer system 800 includes a processor 802, associated memory 804, a storage device 806, and numerous other elements and functionalities typical of today's computers (not shown). The computer system 800 may also include input means, such as a keyboard 808 and a mouse 810, and output means, such as a monitor 812. The computer system 800 is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system 800 may be located at a remote location and connected to the other elements over a network. Further, the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer readable medium comprising executable instructions for visually representing a status of a plurality of storage device slots and a plurality of attached storage devices by:

assigning a logical name to a storage device slot based on an enumeration rule;

detecting a storage device attached to a computer system;

storing a correlation between a physical location of the storage device slot and the assigned logical name;

monitoring an availability and an operating status of the plurality of storage device slots and the plurality of attached storage devices; and generating a what-you-see-is-what-you-get (WYSIWYG) representation of the plurality of storage device slots and the plurality of attached storage devices, wherein the WYSIWYG representation includes physical location information, operating status information, and logical names for the plurality of storage device slots and the plurality of attached storage devices, wherein the WYSIWG representation includes a matrix-like map displaying a plurality of storage devices, each of which assigns one or more sets of the physical location information and the logical name correlated with one another.

2. The computer readable medium according to claim 1, further comprising executable instructions for generating a list of the plurality of attached storage devices correlated to a plurality of logical device names.

3. The computer readable medium according to claim 2, wherein the list of the plurality of attached storage devices includes device serial numbers, vendor names, and model names for each attached storage device.

4. The computer readable medium according to claim 2, wherein the list of the plurality of attached storage devices includes temperature information for each attached storage device.

5. The computer readable medium according to claim 1, wherein the WYSIWYG representation of the plurality of storage device slots and the plurality of attached storage devices are color-coded.

6. The computer readable medium according to claim 1, wherein the step of assigning the logical name to the storage device slot based on the enumeration rule uses a dynamic assignment contingent upon a device probing sequence.

7. The computer readable medium according to claim 1, wherein the step of generating the WYSIWYG representation of the plurality of storage device slots and the plurality of attached storage devices is initiated by a user command.

8. A computer-readable medium having storage device location program comprising:

an operating system configured to assign a logical name to a storage device attached to a computer system;

a mapping software configured to correlate the logical name to a physical device name of the storage device attached to the computer system;

a status detecting program configured to update an operating status of the storage device; and a display program configured to generate a what-you-see-is-what-you-get (WYSIWYG) representation of a physical location of the storage device attached to the computer system, wherein the WYSIWYG representation includes a matrix-like map displaying a plurality of storage devices, each of which assigns one or more sets of the physical location information and the logical name correlated with one another.

9. The computer-readable medium according to claim 8, wherein the display program includes the operating status of the storage device attached to the computer system.

10. The computer-readable medium according to claim 9, wherein the status detecting program is also configured to update an operating status of a plurality of storage device slots.

11. The computer-readable medium according to claim 10, wherein the display program is also configured to generate a WYSIWYG representation of physical locations of the plurality of storage device slots 12. The physical computer-readable medium according to claim 11, wherein the display program includes the operating status of the plurality of storage device slots.

13. A method for visually representing a status of a plurality of storage device slots and a plurality of attached storage devices, comprising:

assigning a logical name to a storage device slot based on an enumeration rule;

detecting a storage device attached to a computer system;

storing a correlation between a physical location of the storage device and the assigned logical name;

monitoring an availability and an operating status of the plurality of storage device slots and the plurality of attached storage devices; and generating a what-you-see-is-what-you-get (WYSIWYG) representation of the plurality of storage device slots and the plurality of attached storage devices, wherein the WYSIWYG representation includes physical location information, operating status information, and logical names for the plurality of storage device slots and the plurality of attached storage devices, wherein the WYSIWYG representation includes a matrix-like map displaying a plurality of storage devices, each of which assigns one or more sets of the physical location information and the logical name correlated with one another.

14. The method according to claim 13, further comprising executable instructions for generating a list of the plurality of attached storage devices correlated to a plurality of logical device names.

15. The method according to claim 14, wherein the list of the plurality of attached storage devices includes device serial numbers, vendor names, and model names for each attached storage device.

16. The method according to claim 14, wherein the list of the plurality of attached storage devices includes temperature information for each attached storage device.

17. The method according to claim 13, wherein the WYSIWYG representation of the plurality of storage device slots and the plurality of attached storage devices are color-coded.

18. The method according to claim 13, wherein the step of assigning the logical name to the storage device slot based on the enumeration rule uses a dynamic assignment contingent upon a device probing sequence.

19. The method according to claim 13, wherein the step of generating the WYSIWYG representation of the plurality of storage device slots and the plurality of attached storage devices is initiated by a user command.

* * * * *

UNITED STATES PATENT AND TRADEMARK OFFICE
CERTIFICATE OF CORRECTION

PATENT NO. : 7,437,505 B2  Page 1 of 1
APPLICATION NO. : 11/441297
DATED : October 14, 2008
INVENTOR(S) : Michael N. Chew It is certified that error appears in the above-identified patent and that said Letters Patent is hereby corrected as shown below:

In the Claims:

In Claim 1, column 7, line 21, "WYSIWG" should be --WYSIW<u>Y</u>G--.

Signed and Sealed this

Thirtieth Day of December, 2008

*JON W. DUDAS*
*Director of the United States Patent and Trademark Office*